United States Patent [19]

Reed

[11] Patent Number: 5,349,567

[45] Date of Patent: Sep. 20, 1994

[54] LEAST MEAN SQUARE (LMS) NORMALIZER FOR ACTIVE SONAR

[75] Inventor: Francis A. Reed, Yorba Linda, Calif.

[73] Assignee: Hughes Aircraft Company, Los Angeles, Calif.

[21] Appl. No.: 110,901

[22] Filed: Aug. 24, 1993

[51] Int. Cl.$^5$ ............................................. G01S 15/00
[52] U.S. Cl. ..................................... 367/100; 367/901
[58] Field of Search ....................... 367/100, 901, 135; 342/93

[56] References Cited

U.S. PATENT DOCUMENTS

| | | | |
|---|---|---|---|
| 3,778,822 | 12/1973 | Bauer | 342/93 |
| 4,270,223 | 5/1981 | Marston | 455/305 |
| 5,251,185 | 10/1993 | Baggenstoss | 367/100 |

OTHER PUBLICATIONS

"An Algorithm for Linear Constrained Adaptive Array Processing," O. L. Frost, III, Proc. IEEE, vol. 60, pp. 926–935, 1972.

*Primary Examiner*—Ian J. Lobo
*Attorney, Agent, or Firm*—W. K. Denson-Low

[57] ABSTRACT

A normalizer based on a Least Mean Square (LMS) adaptive algorithm configured to provide effective normalization when the background noise is locally non-stationary and when the target may be subject to time spread of unknown extent. The LMS algorithm used in the normalizer includes an adaptive filter in both the primary and reference inputs as a means of adapting to variations in both the signal and noise statistics. The LMS algorithm is implemented on the logarithm of the data, so that the difference minimized in the LMS structure drives the ratio of the signal power to noise power to a constant value. The algorithm can be used as a range normalizer by running it over range in each doppler bin, or as a frequency normalizer by operating across doppler in each range bin. By continually adapting to the statistics present in the data, the normalizer more effectively deals with the variations in the noise and signal statistics.

22 Claims, 7 Drawing Sheets

LEAST MEAN SQUARE (LMS) NORMALIZER FOR ACTIVE SONAR

BACKGROUND OF THE INVENTION

The present invention relates to a normalizer based on a Least Mean Square (LMS) adaptive algorithm which is configured to provide effective normalization when the background noise is locally non-stationary and when the target may be subject to time spread of unknown extent.

FIG. 1 is a block diagram of a typical active sonar system 20. A waveform, such as a pulsed CW or FM, is transmitted by the transmitter 22 via a transmit array 24, which may be co-located with the receiver elements or physically separated. The waveform echo is detected by a matched filter processor, as shown. An array 26 of hydrophones is used to form a beam, having directional response in the direction of interest and low response elsewhere, in the direction of the target. The processing to form such a beam is generally known as a beamformer. The beamformer 28 output is passed to a matched filter 30, which correlates the received signals with a replica of the transmitted signal. The magnitude squared (32) of the matched filter output exhibits a peak at the location of any reflection present in the beamformer output. The time series at the matched filter output can be viewed as a plot of received energy versus range. Typically, the matched filter output will not only exhibit peaks due to target echoes, but those due to background noise, reflections from objects such as bottom and surface, and reverberation, which is a more diffuse reflection of the sound from the many small scatterers in the ocean.

The detection process 36 consists of comparing received signal plus noise to a threshold, and declaring a detection wherever the threshold is exceeded. If this threshold is applied directly at the matched filter output, the number of threshold crossings reflects the variations of noise power with range. This variation can be very significant in many environments. An objective of most active sonar signal processors is to achieve Constant False Alarm Rate (CFAR) operation, in which the number of false alarms (or detections of non-target echoes or noise) is more or less constant with range. This is usually achieved by processing the matched filter output through a normalizer 34, as shown in FIG. 1, prior to the threshold test. The normalizer 34 estimates the noise background power by examining the noise background in the vicinity of each range cell, then divides the power in that cell by the noise estimate. The normalizer output is therefore nominally a signal-to-noise ratio in cells containing signal, and nominally unity in noise cells. Consequently, if the normalizer effectively estimates the noise power, the number of false alarms will be constant with range.

Range normalizers are known which estimate the noise power by examining range cells near the cells of interest. A range gap is left between the signal bin and the bins used to estimate the noise in order to assure that signal components from a range spread signal do not corrupt the noise measurement. The estimate is based on the power in two noise windows containing N/2 cells on either side of the cell of interest, as shown in FIG. 2. Generally, a pass through the data in the noise windows is made to eliminate cells with large power (since they may be signal components and would corrupt the noise estimate). N must be chosen large enough to give a good estimate of the noise background. However, since each bin represents a range cell, using many range bins makes the data used in the estimate further away from the cell of interest, so that it may not be representative of the local noise, particularly in environments with a lot of variability, like shallow water. This can reduce the effectiveness of the normalizer in producing CFAR operation.

The signal can also be spread in many environments, including shallow water, so that it appears in a number of range cells. In conventional systems, this is handled by summing a number of range cells to form the signal output, often referred to as over-averaging. This combines the total signal energy into a single output cell if the size of the signal window is matched to the signal spread, as shown in FIG. 3. If the window is too large, noise is summed with the signal, while all the signal energy is not combined if the window is too small. The size of the window must therefore be set in the conventional active sonar, and may not match the signal spread in variable environments.

In active sonars it is desirable to operate at a constant false alarm rate (CFAR) in order to avoid overloading the operator. The false alarm rate is determined by the statistics of the noise in the absence of target, as well as the detection threshold applied at the matched filter-energy detector output. The process of estimating the noise statistics and using the estimate to set the detection threshold is usually referred to as normalization, and is equivalent to using the noise estimate to scale the incoming data, which is compared to a fixed threshold.

The goal of the normalizer in an active sonar system is to normalize the background in order to provide a CFAR in the presence of noise only, while providing detection of signals of interest. The purpose of this invention is to provide these functions when the background noise is locally non-stationary and when the target may be subject to time spread of unknown extent. In existing normalizers this is done either by attempting to exclude data samples that are "outliers" inconsistent with the overall statistics (which does not directly address non-stationary statistics) or by non-parametric techniques, which attempt to be insensitive to statistics (at some sacrifice in performance). The LMS normalizer in accordance with this invention does this by dynamically determining the signal and noise statistics using an adaptive algorithm which attempts to minimize the ratio of the power in a signal bin to that computed in a noise averaging window, subject to a constraint that assures that the signal will be passed by the normalizer.

Numerous normalization algorithms currently exist for use in radar and active sonars. The most widely used are cell averaging (CA) normalizers, which compute the average noise power in averaging windows adjacent to the signal bin of interest, and then use this average to normalize the signal bin, as described in "A performance comparison of four noise background normalization schemes proposed for signal detection systems," W. A. Struzinski and E. D. Lowe, J. Accoust. Soc. Am., Vol. 786, No. 6, December 1984. A variation of this structure that is simpler to implement and operates over a larger dynamic range than the CA normalizer, but yields slightly degraded performance is the LGO/CFAR normalizer, described in "Detection Performance of the Cell Averaging LOG/CFAR Receiver," V. G. Hansen and H. R. Ward, IEEE Trans. Aerospace and Electronics Systems, Vol. AES-8, No. 5, September 1972. This normalizer implements a CA average on the logarithm of the data to be normalized. These normalizer structures assume 1) stationary statistics on the noise background, and 2) that the noise averaging windows contain only noise (no signal). Their performance can be severely degraded if these assumptions are invalid.

Several approaches have been taken into account for background non-stationarity and the presence of signal in the noise windows (as can occur with spread targets or in a multitarget environment). One approach is to use a multiple-pass normalization in conjunction with a CA algorithm. In multiple-pass techniques, the first noise average is used to set a threshold for the rejection of samples in the noise averaging window, usually followed by replacement of the values by the initial average. This is followed by a conventional normalizer pass on the resulting data. Usually only one of these so-called "outlier rejection" passes is used prior to normalization, but multiple passes can be used. The multiple-pass normalizers do not directly deal with non-stationary background, but assume that the background is uniform except for a few outliers and signals. Hence, when the background statistics show significant variation, the performance is severely degraded.

A second approach to non-stationary and unknown statistics has been the class of ordered statistic normalizers, as described in "Radar CFAR Thresholding Clutter and Multiple Target Situations," H. Rohling, IEEE Trans. Aerospace and Electronic Systems, Vol. AES-19. No. 5, July 1983. The more complex ordered statistic normalizers order the data in the noise windows by magnitude, then utilize the $n^{th}$ largest value (e.g., the median) to normalize. These normalizers have some advantages when there are multiple targets present or near the edges of regions where the noise is rapidly increasing, but can be noisier because they do not include averaging. Hybrid algorithms which perform some averaging prior to ordering the data can be used to overcome some of the increased noise in ordered statistic normalizers. The simplest of these are modifications of the CA normalizer known as the "greatest of" (GO) or "least of" (LO) normalizer. The GO (LO) normalizer separately computes the noise average in windows on either side of the signal bin, then uses the larger (smaller) of the averages to normalize the signal bin. These normalizers provide a compromise between the advantages of CA and ordered statistics normalizers. Ordered statistic normalizers are non-parametric processors that account for unknown or varying statistics by being relatively insensitive to them. Such processors sacrifice performance in a given environment in order to maintain acceptable performance over a range of environments.

SUMMARY OF THE INVENTION

The invention is a normalizer based upon a Least Mean Square (LMS) adaptive algorithm which is configured to provide effective normalization when the background noise is locally non-stationary and when the target may be subject to time spread of unknown extent. In one embodiment, the LMS algorithm used in the normalizer includes an adaptive filter in both the primary and reference inputs as a means of adapting to variations in both the signal and noise statistics. In another, alternate embodiment, an adaptive filter is used only in the reference inputs which adapts only to variations in the noise. Further, the LMS algorithm is implemented on the logarithm of the data, so that the difference minimized in the LMS structure drives the ratio of the signal power to noise power to a constant value. The algorithm can be used as a range normalizer by operating it over range in each doppler bin, or as a frequency normalizer by operating across doppler in each range bin. By continually adapting to the statistics present in the data, the normalizer more effectively deals with the variations in the noise and signal statistics.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
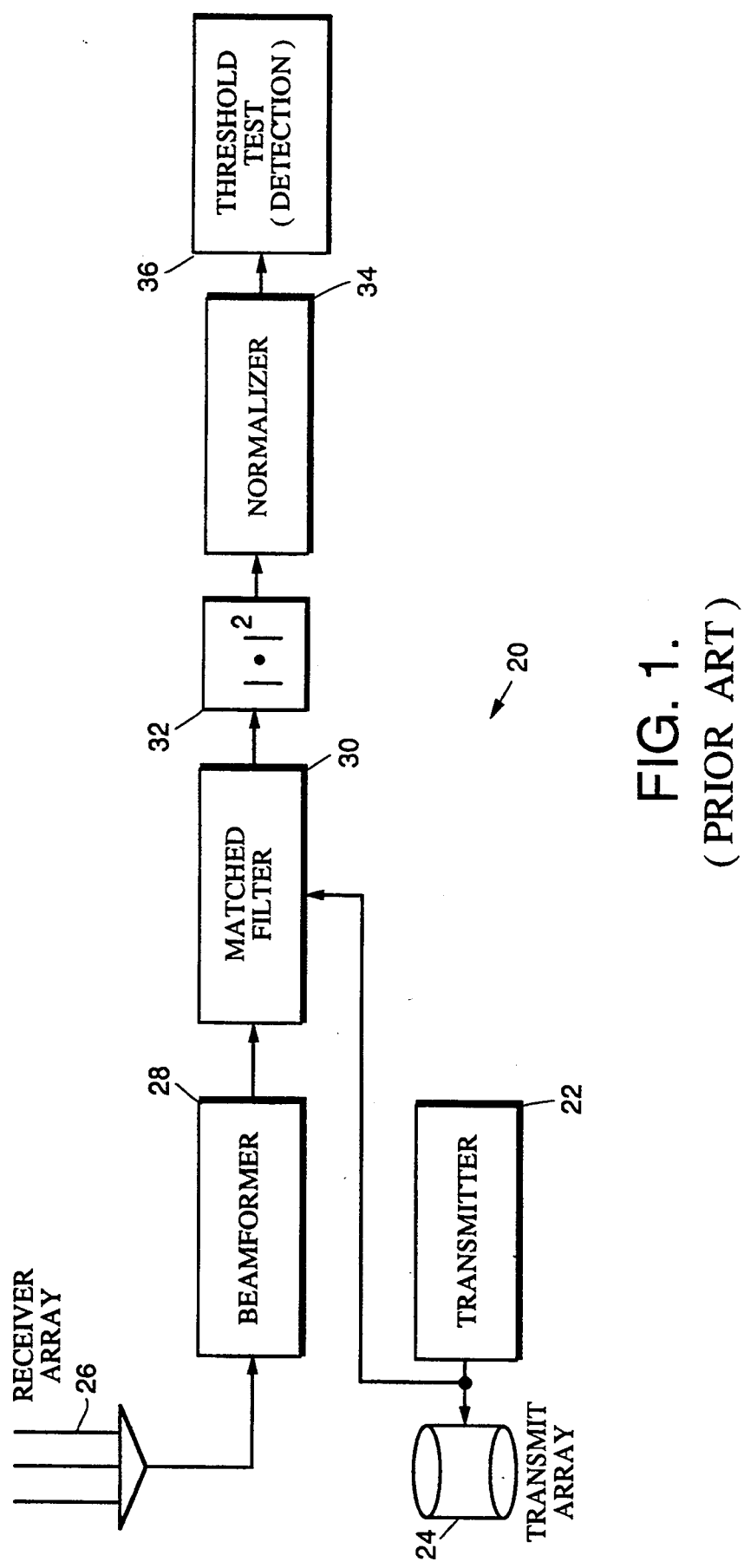
FIG. 1 is a simplified schematic block diagram illustrating elements of an active sonar system.
Figure 2:
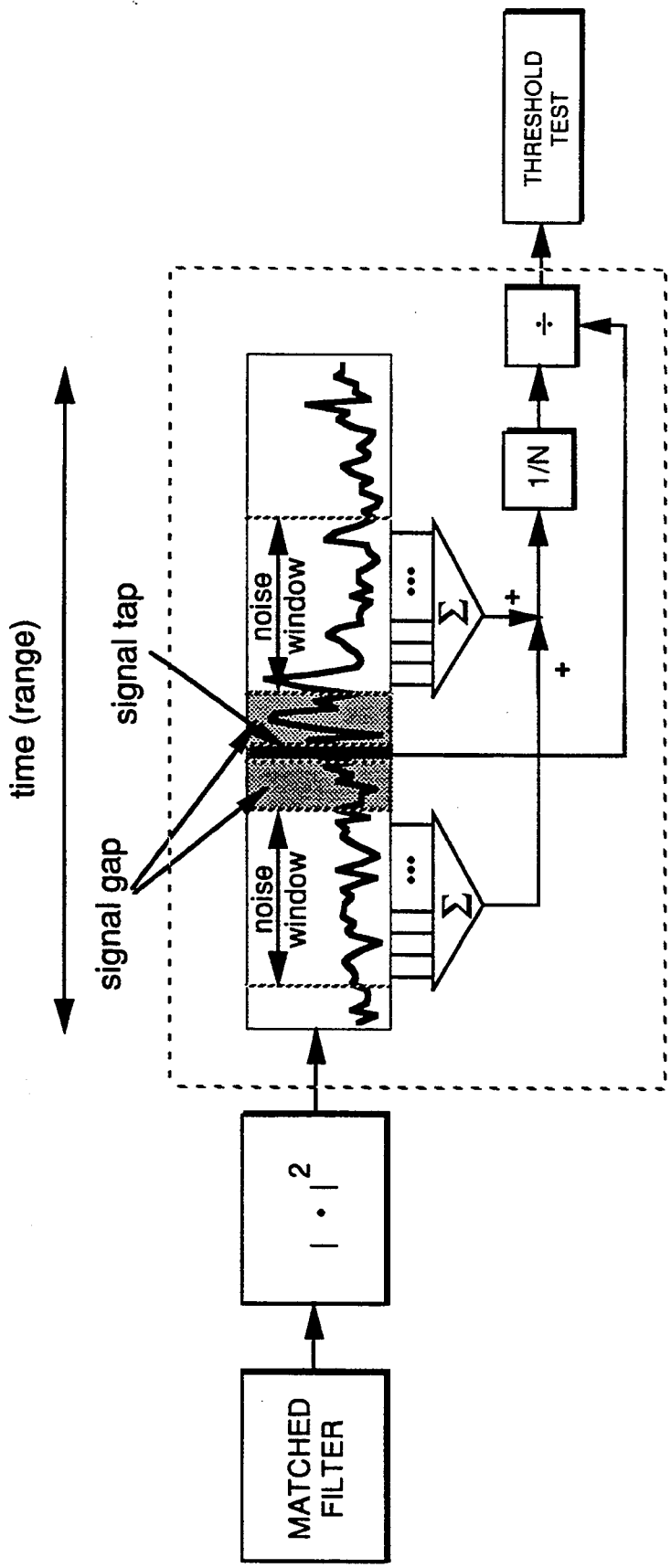
FIG. 2 is a schematic block diagram of a conventional range normalizer comprising the active sonar system.
Figure 3:
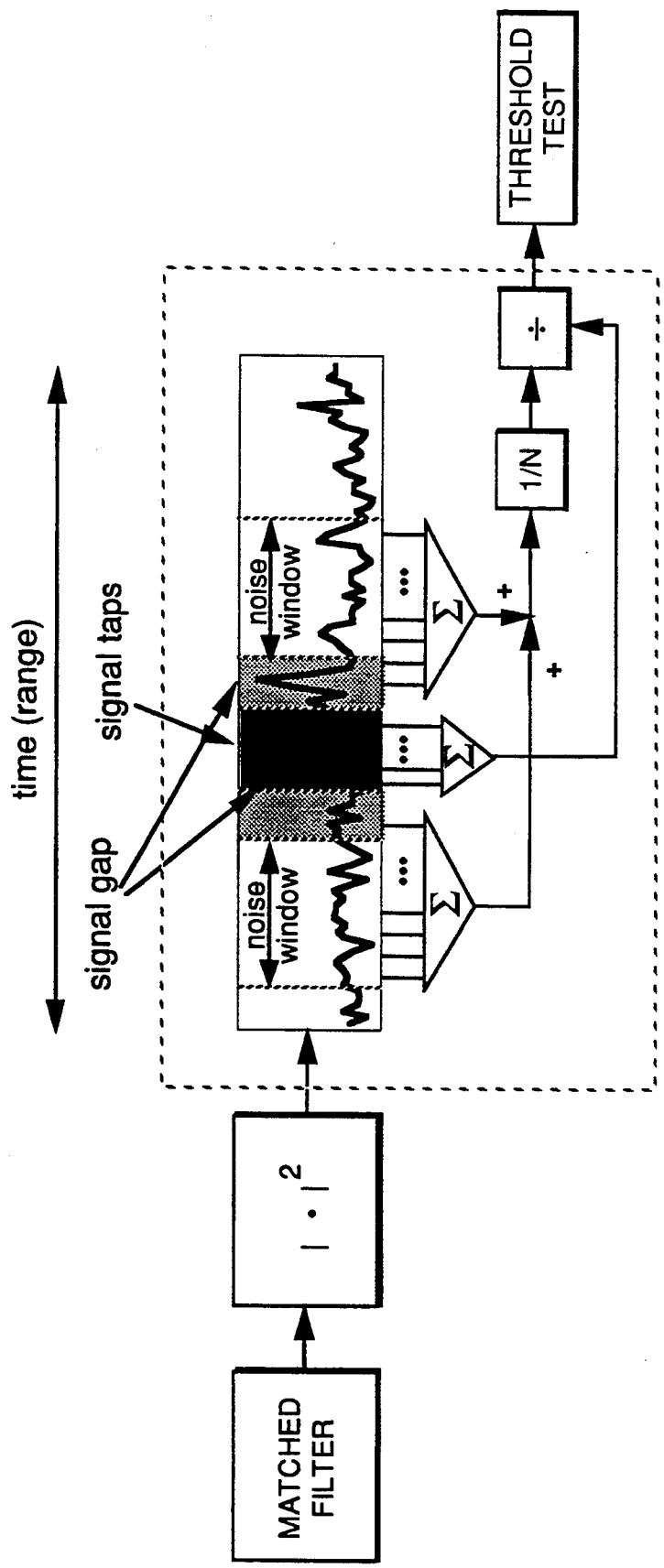
FIG. 3 is a schematic block diagram of a conventional range normalizer with over-averaging to account for signal spread.
Figure 4:
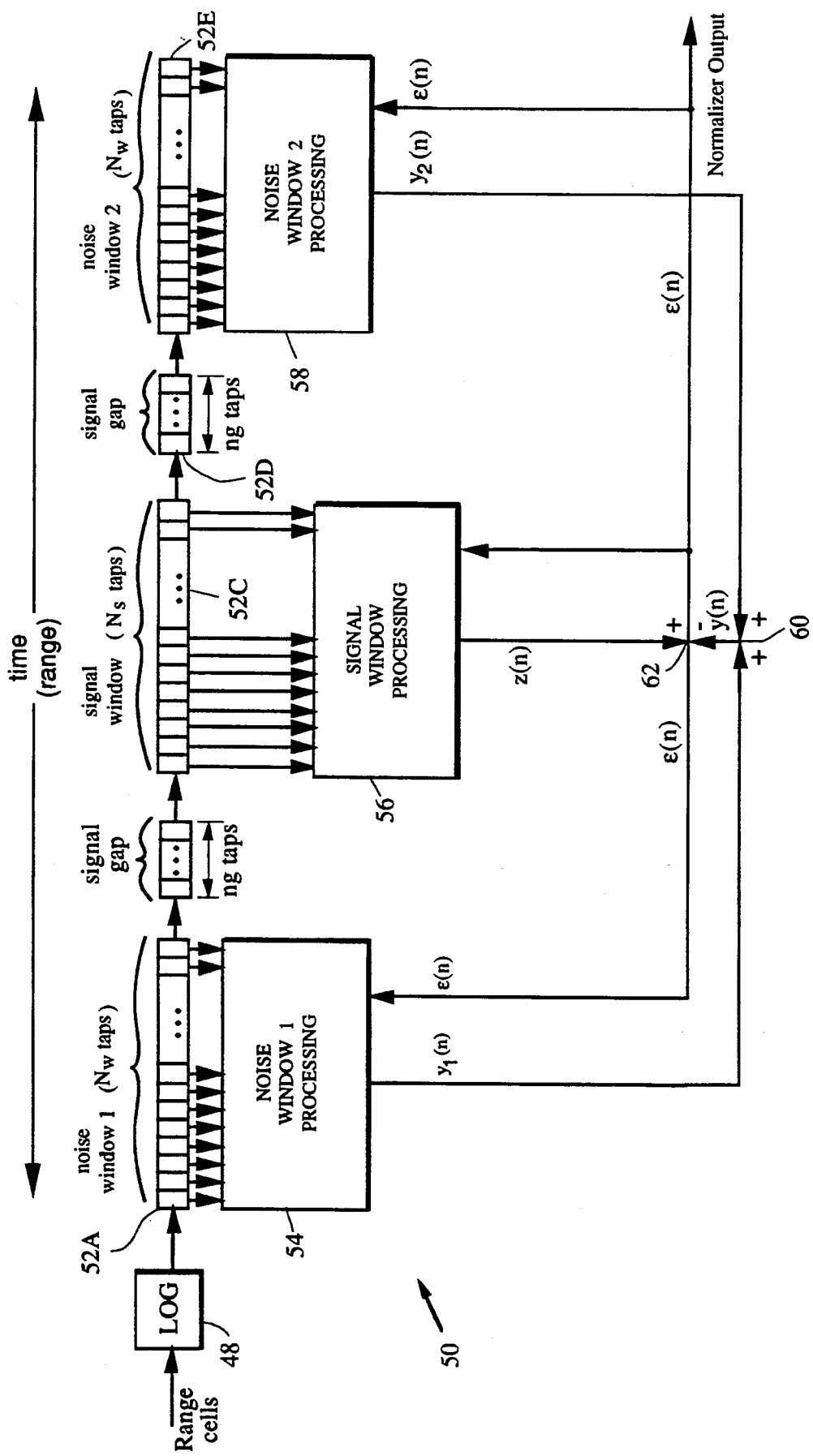
FIG. 4 illustrates an LMS adaptive normalizer implemented as a FIR filter in accordance with the invention, and having a filter in the desired input.

A LMS adaptive normalizer 50 in accordance with this invention, and for use in an active sonar system as shown in FIG. 1, is shown in block diagram form in FIG. 4. This exemplary implementation is employed as a range normalizer in which the processing is done across range bins in each doppler cell. In this case, the sequence of the squared (32) matched filter outputs (range bins) provided by matched filter 30 (FIG. 1) is provided as the input to a logarithm function 48, which computes the logarithm of the sequence of range bins. The particular base to which the logarithm is computed does not matter. The sequence of logarithm values is provided to the algorithm comprising normalizer 50. As will be shown below, this logarithm function (50) is crucial to the use of the LMS algorithm as a normalizer. The data is entered into a tapped delay line 52 with $2N_w+2N_g+N_s$ taps, as shown. The contents of the tapped delay line 52 at time n is the vector, $$[x_1(n)\ x_2(n)\ldots x_{N_w}(n)\ldots x_{2N_w+2N_g+N_s}(n)]^T \quad (1)$$

where $[x]^T$ denotes the transpose of the vector $[x]$.

The noise window vector is defined as $$X(n)=[x_1(n)\ x_2(n)\ldots x_{N_w}(n)s_{N_w+2N_g+N_s+1}(n)\ldots x_{2N_w+2N_g+N2}(n)]^T \quad (2)$$

The signal window vector is defined as $$D(n) = [x_{Nw+Ng+1}(n) \ldots x_{Nw+Ng+Ns}(n)]^T \quad (3)$$

The two data segments 52A and 52E, each $N_w$ taps long, used to develop the noise estimate, are generally referred to as the noise estimation windows in conventional normalizers. These $2N_w$ taps are multiplied by adaptive weights, $w_k(n)$, $k=1, \ldots 2N_w$, in respective noise window processing function blocks 54 and 58, shown in more detail in FIGS. 5 and 6, to produce outputs $y_1(n)$ and $y_2(n)$, which are then summed at summing node 60 to form the output $y(n)$, where n denotes the value of the parameter at iteration n, $$y(n) = \sum_{k=1}^{N_w} w_k(n)x_k(n) + \sum_{k=N_w+1}^{2N_w} w_k(n)x_{k+2Ng+Ns}(N) = W^T(n)X(n) \quad (4)$$

Figure 7:
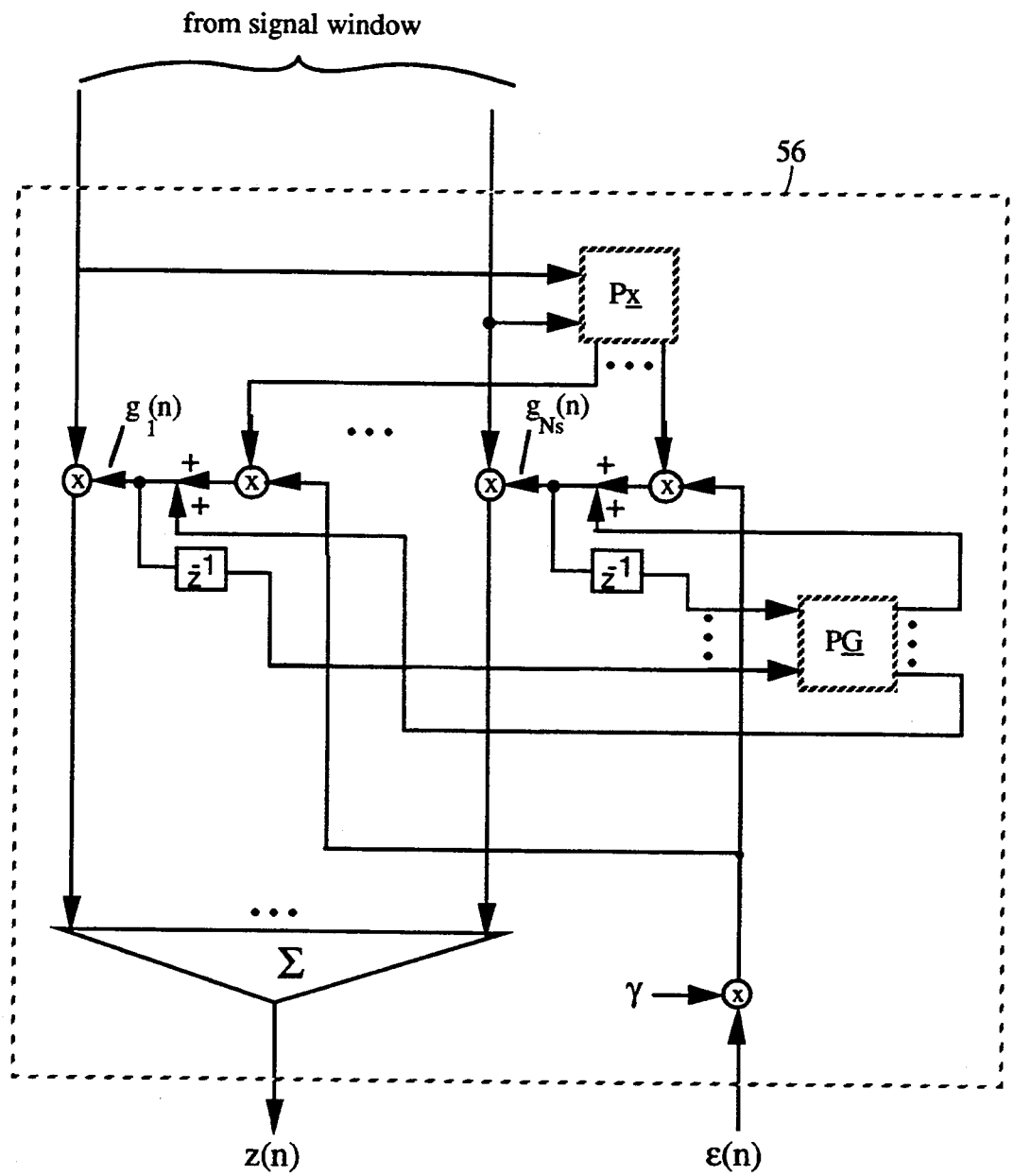
FIG. 7 illustrates the signal window processing carried out in the normalizer of FIG. 4.

The $N_s$ taps referred to as the signal window 52C are similarly processed by the signal window processing function block 56, shown in more detail in FIG. 7, to form the output, $z(n)$, given by $$z(n) = \sum_{k=1}^{N_s} g_k(n)x_{k+Nw+Ng}(n) = G^T(n)D(n) \quad (5)$$

In FIG. 7 the operations Px and PG denote matrix multiply operations, i.e., if $p_i$ is the vector comprising the $i^{th}$ row of the matrix P, then $Px = \Sigma_i p_i x$ and $PG = \Sigma_i p_i G$.

The $N_s$ taps in the signal window 52C are separated from the noise estimation windows (52A and 52E) by the guard windows 52B and 52D, each $N_g$ cells wide. The combined output $y(n)$ is then subtracted (at node 63) from $z(n)$ to form $\epsilon(n)$, taken as the normalizer output. In this embodiment, the eights in the signal window, $g_k(n)$, and the noise window, $w_k(n)$, are adjusted adaptively to minimize the mean square value of the output $\epsilon(n)$, given as $$\epsilon(n) = z(n) - y(n) \quad (6)$$

The weight adaptation is based on a modification of the well-known Least Mean Square (LMS) algorithm (see "Adaptive Filters", B. Widrow *Aspects of Network and System Theory*, R. K. Kalman and N. DeClaris, eds., New York, John Wiley and Sons, 1971).

The LMS algorithm has been widely used in spatial and temporal processing applications where the input statistics are unknown. The original algorithm used a Finite Impulse Response (FIR) filter in one input, usually denoted the reference input. The weights of the FIR filter are adjusted adaptively to minimize the mean square difference between the filter output and a desired input $d(n)$. The input sequence $x(n)$ is passed through a FIR filter with adaptive weights producing an output, $y(n)$, with $w_k(n)$ the weight applied to the kth filter tap on the nth iteration.

$$y(n) = \sum_{k=1}^{K} w^*_k(n)x(n-k) \quad (7)$$

This can be written in vector form as $$y(n) = W^t(n)X(n) \quad (8)$$

where $$W(n) = [w_1(n)\ w_2(n) \ldots w_K(n)]^T \quad (9)$$

$$X(n) = [x(n)\ x(n-1) \ldots x(n-K)]^T$$

and where $X^T$ denotes transpose of the vector x and $x^t$ is its transpose conjugate. The difference between the filter output and the desired signal is usually called the error, and is given by $$\epsilon(n) = d(n) - y(n) \quad (10)$$

The weight iteration that minimizes the mean square error is $$W(n+1) = W(n) + 2\mu\epsilon(n)X(n) \quad (11)$$

with $\mu$ a weight update coefficient that controls the convergence rate and stability of the algorithm. The algorithm noise above the minimum mean square value, often referred to as the misadjustment, is also controlled by the parameter $\mu$ with the misadjustment decreasing with decreasing $\mu$.

The LMS algorithm can be rederived for the case when a FIR filter is included in both the reference and desired inputs, as in the embodiment of FIG. 4. Let the X(n) vector be defined as above as the contents of the K element tapped delay line in the reference input, and D(n) be the corresponding M dimensional vector for the desired input. In order to assure that the signal in the desired input is always passed, a constraint on the weights is used, which is based upon the method described by "An Algorithm for Linear Constrained Adaptive Array Processing," O. L. Frost, III, Proc. IEEE, Vol. 60, pp. 926–935, 1972. The constraint is that the sum of the $g_k(n)$ be one, $$C^T G(n) = 1, C = [1\ 1\ 1\ 1 \ldots 1]^T$$

$$G(n) = [g_1(n)\ g_1(n) \ldots g_1(n)]^T \quad (12)$$

The constrained LMS adaptation involve a pair of coupled difference equations for G(n) and W(n), $$W(n) + 1) = W(n) + 2\mu\epsilon(n)X(n) \quad (13)$$
$$G(n + 1) = PG(n) - 2\gamma P\epsilon(n)D(n) + (1/M)C$$
$$\epsilon(n) = z(n) - y(n)$$
$$P = I - C(C^TC)^{-1}C^T = I - (1/M)\ CC^T$$

Here, a different adaptation parameter is used for the desired ($\gamma$) and reference ($\mu$) inputs to allow for different time constants in the signal and noise windows.

Figure 6:
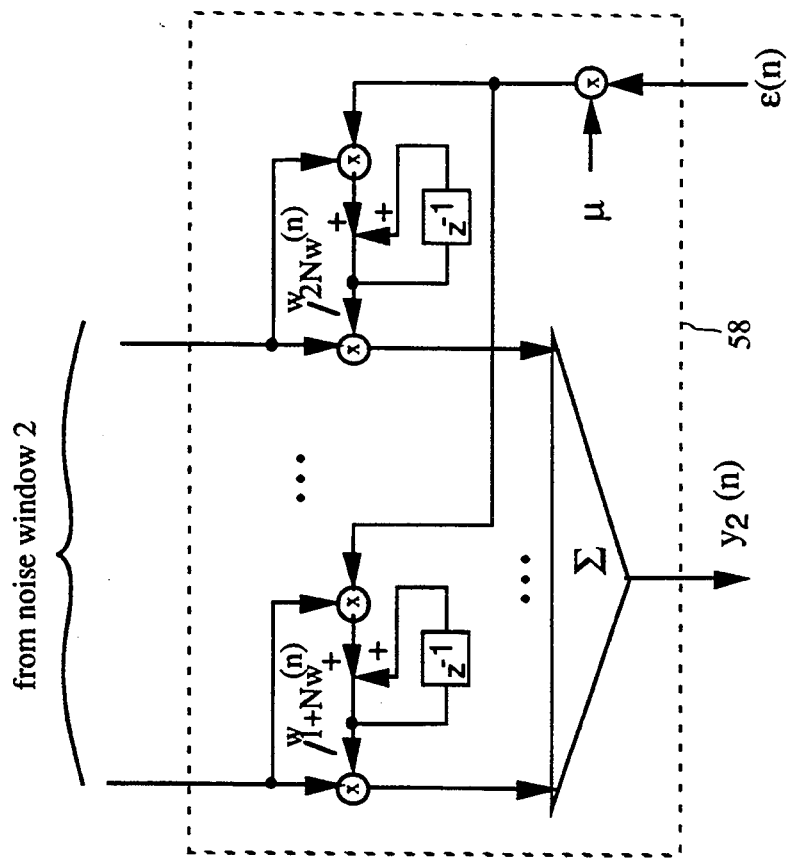
FIGS. 5 and 6 illustrate the respective noise window processing performed by the normalizer of FIG. 4 in the two noise windows sandwiching the signal window.
Figure 5:
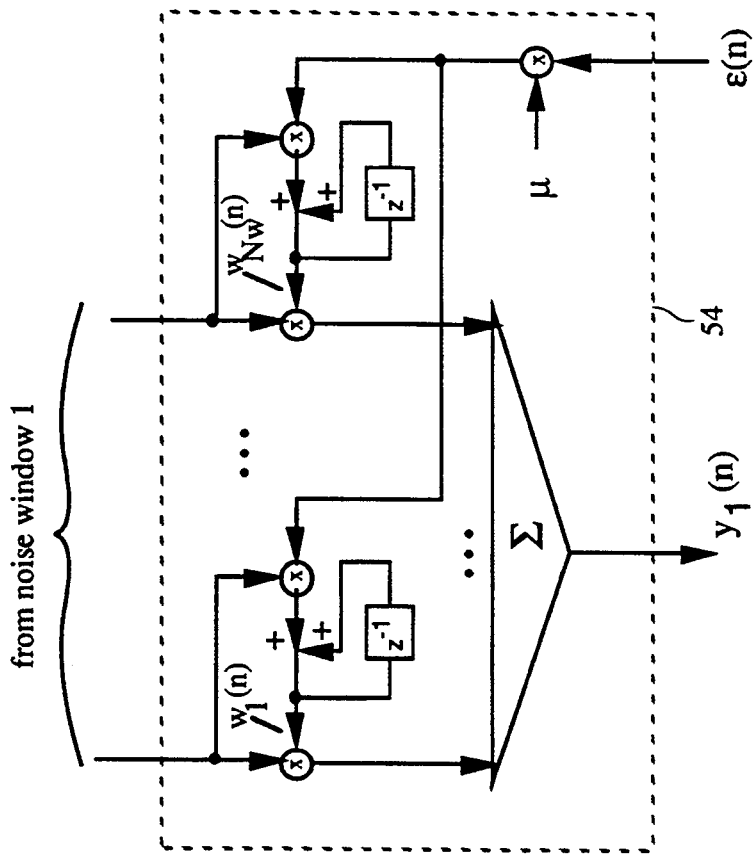

When the general form of the constrained LMS algorithm given in equations (12) and (13) is applied in the LMS normalizer, X(n) and D(n) are as defined in eq. 2 and eq. 3, and the FIR filter sizes are $M = N_s$ and $K = 2N_w$. This is shown in FIGS. 5–7.

While the derivation of the algorithm assumes stationarity of the input, its iterative nature allows it to follow time varying inputs, in which case there is a trade-off between larger values of $\mu$ and $\gamma$ to follow the time varying input and smaller values to reduce misadjustment. It is this ability of the algorithm to adapt with respect to an optimality criterion while following input non-stationarities that makes it of interest for normalization in regions of varying noise statistics. Note that when applied in the normalizer, the presence of the logarithm allows the difference operation inherent in error calculation of the LMS algorithm to implement the minimization of the ratio of the desired and reference inputs. This is similar to the structure employed in the LGO/CFAR normalizer which utilizes fixed weights in the noise window.

The rationale behind the LMS adaptive structure is as follows:

(1) By providing a FIR filter structure on the noise windows rather than just averaging, the LMS normalizer can better adapt to non-stationarities in the background as the normalizer moves over the range-doppler map.

(2) The inclusion of a filter in the signal window allows the normalizer to sum the signal over more than one bin when time spread exists, usually referred to as over-averaging.

(3) Separate time constraints in the signal and noise windows allow the adaptation time constants to be set differently. In the noise window, the time constant is set fast enough (by increasing $\mu$) to account for the noise variability, but so that it is relatively unresponsive to signals as they pass through the noise windows. The signal window time constant is set shorter than the noise window time constant (by making $\gamma$ larger) in order to adjust to the narrow signal time spread as it passes through the signal window.

(4) By attempting to utilize varying statistics as they pass through the normalizer rather than rejecting data that appears non-stationary or using non-parametric techniques, the LMS normalizer attempts to maintain performance over varying statistics without sacrificing performance in stationary environments.

While the LMS normalizer has been described as a range normalizer, it can be applied as a one dimensional normalizer over doppler as well; the normalize is identical expect that it operates over the Doppler cells (frequency) instead of range. Moreover, the LMS normalizer can implement two-dimensional normalization as a sequence of 1-D operations by first normalizing in range then in Doppler.

A special case of the algorithm in which the signal window is set to one cell ($N_s=1$), so that the signal weight is always 1. Then eq. 5 reduces to $$z(n) = x_{Nw+Ng+1}(n) \qquad (14)$$

Figure 8:
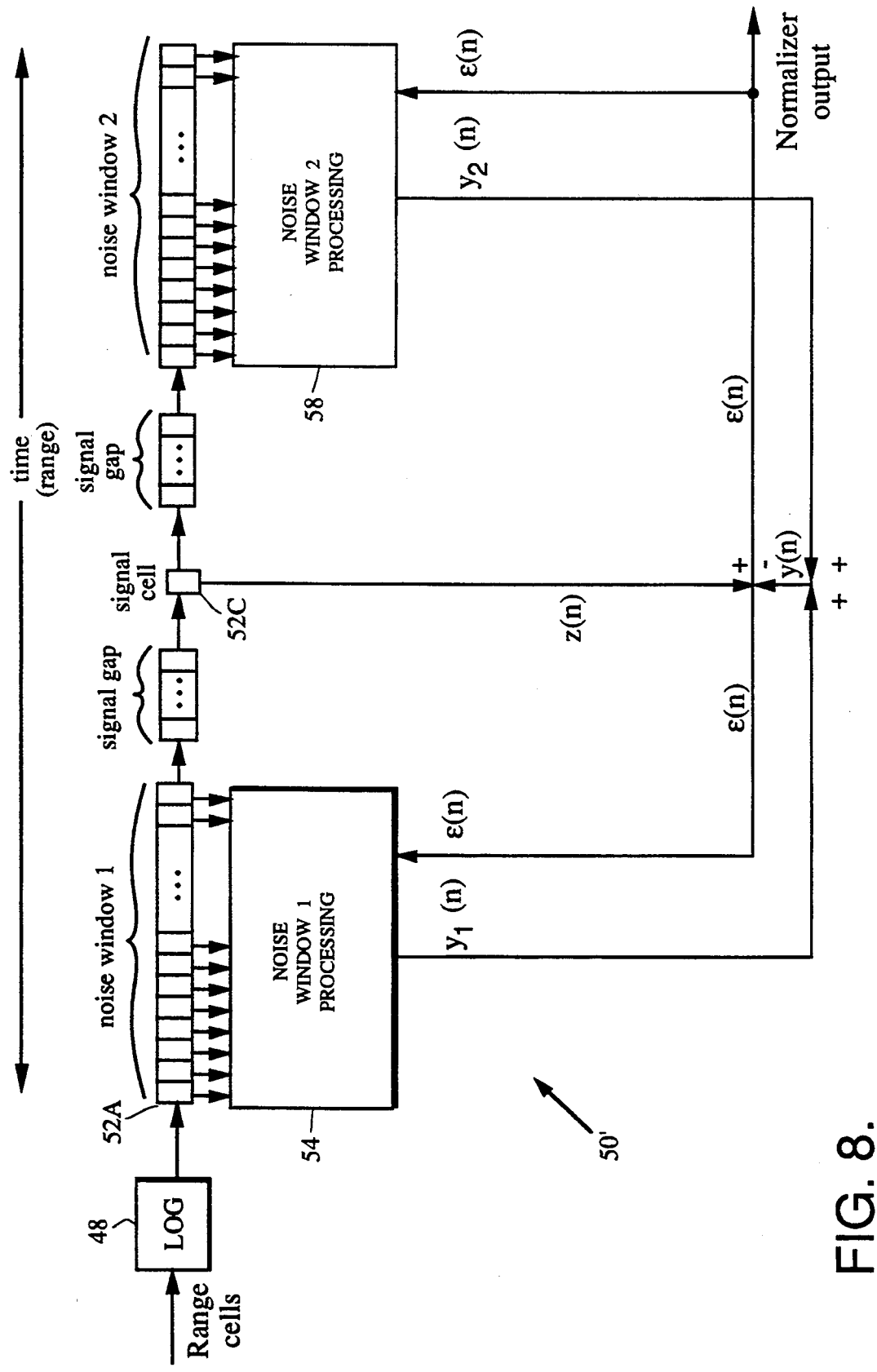
FIG. 8 illustrates a simplified block diagram of an alternate embodiment of an LMS adaptive normalizer in accordance with the invention, in which the adaptation is implemented only in the noise window.

FIG. 8 is a schematic block diagram of an LMS range normalizer 50' in accordance with the invention, which does not provide adaptation in the signal window, i.e., in which the signal window is set to one cell 52C', as in eq. 14 In FIG. 8, like numbered elements correspond to like numbered elements in the normalizer 50 of FIG. 1.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. In an active sonar including a matched filter processor for processing received waveform echoes, an improved normalizer responsive to a sequence of matched filter output data to provide a normalizer output, comprising:

means responsive to said matched filter output data for providing a logarithm of said output data; and normalizer processing means for processing said logarithm of said output data to dynamically adapt to locally non-stationary noise, said processing means comprising means for applying an adaptive Least Means Square (LMS) algorithm to said logarithm of said output data.

2. The normalizer of claim 1 wherein said processing means comprises a tapped delay line into which said logarithm of said sequence of matched filter output data is input, each tap including a corresponding tap weight.

3. The normalizer of claim 2 wherein said taps of said delay line include a signal window comprising one or more signal taps, and first and second noise tap windows each comprising one or more noise taps, said first and second noise windows straddling said signal tap window.

4. The normalizer of claim 3 wherein said means for applying said LMS algorithm comprises LMS weight update means responsive to an output of said normalizer for adaptively adjusting said tap weights of said first and second tap windows in accordance with said LMS algorithm, so that outputs of said taps comprising said first and second windows are weighted by tap weights which are adjusted in accordance with said LMS algorithm.

5. The normalizer of claim 4 wherein said processing means further comprises means for combining said adjusted tap outputs of said first noise window to form a first noise window signal, mean for combining said adjusted tap outputs of said second noise window to form a second noise window signal, and means for combining said first and second noise window signals to provide a combined adjusted noise signal.

6. The normalizer of claim 5 further comprising means for subtracting said combined noise signal from outputs from said one or more signal taps to provide said normalizer output.

7. The normalizer of claim 6 wherein no adaptation is applied to outputs of said signal taps.

8. The normalizer of claim 4 wherein said LMS weight update means further comprises means for adaptively adjusting said tap weights of said signal window taps in accordance with said LMS algorithm, to thereby adapt said normalizer to time-spreading of said signal.

9. The normalizer of claim 8 wherein said signal window comprises a plurality of signal taps, and said processing means further comprises means for combining said taps of said signal window.

10. The normalizer of claim 8 wherein the sum of said tap weights of said signal window taps equals one.

11. The normalizer of claim 8 wherein said means for applying said LMS algorithm includes a noise tap weight update coefficient applied to each noise tap output, and a signal tap weight update coefficient applied to each signal tap output, and wherein said noise coefficient is different from said signal coefficient.

12. The normalizer of claim 11 wherein said noise coefficient is a first time constant parameter which is set fast enough to account for noise variability, yet is relatively unresponsive to signals as they pass through said noise windows.

13. The normalizer of claim 12 wherein said signal coefficient is a second time constant parameter which is set shorter than said first time constant parameter in order to adjust to a narrow signal time spread as said signal passes through said signal window.

14. The normalizer of claim 1 wherein said sequence of matched filter data comprises a sequence of range bin outputs.

15. In an active sonar including a matched filter processor for processing received waveform echoes, an improved normalizer responsive to a sequence of matched filter output data to provide a normalizer output, comprising:
  means responsive to said matched filter output data for providing the logarithm of said output data;
  a normalizer means responsive to said logarithm of said matched filter output data to provide a normalizer output, said normalizer means comprising tapped delay line means having a plurality of tap outputs, wherein said first group of said tap outputs comprise a signal window, and second and third groups of said tap outputs on either side of said signal window taps comprise first and second noise windows, adaptive filter means responsive to said normalizer output for adapting respective tap weights applied to said tap outputs, means for respectively combining said signal window tap outputs, said first noise window tap outputs and said second noise window tap outputs to provide respective combined signal, first noise and second noise components, means for combining said first and second noise components to provide a composite noise component, and means for subtracting said composite noise component from said signal component to provide said normalizer output,
  wherein said normalizer adapts to locally non-stationary noise and time-spreading of said signal component.

16. The normalizer of claim 15 wherein said adaptive filter means performs Least Means Square (LMS) filtering, and comprises LMS weight update means responsive to said normalizer output for adaptively adjusting said tap weights.

17. The normalizer of claim 15 wherein said adaptive filter means comprises Finite Impulse Response filter means.

18. The normalizer of claim 15 wherein the sum of said tap weights applied to said tap outputs of said signal window equals one.

19. The normalizer of claim 15 wherein said adaptive filter means further comprises means for applying a noise time constant coefficient to each of said tap outputs comprising said first and second noise windows, and means for applying a signal time constant coefficient to each of said tap outputs comprising said signal window, and wherein said noise time coefficient is a different value than the value of said signal coefficient.

20. The normalizer of claim 19 wherein noise time constant coefficient is set fast enough to account for noise variability, yet is relatively unresponsive to signals as they pass through said noise windows.

21. The normalizer of claim 19 wherein said signal time constant coefficient is set shorter than said noise time constant coefficient in order to adjust to a narrow signal time spread as said signal passes through said signal window.

22. An active sonar, comprising:
  a transmitter for generating a transmit waveform signal;
  a transmit transducer array for transmitting said transmit signal;
  a receiver transducer array;
  a beamformer responsive to outputs of said receiver array for producing a beamformer output;
  matched filter processing means responsive to a replica of said transmit waveform signal and to said beamformer output for producing a sequence of matched filter output signals;
  a normalizer for processing said matched filter output signals;
  threshold test means responsive to normalizer outputs for comparing said normalizer outputs to a threshold and declaring a detection when said threshold is exceeded; and
  wherein said normalizer comprises:
    means responsive to said matched filter output signals for providing the logarithm of said matched filter output signals;
    tapped delay line means having a plurality of tap outputs, wherein said first group of said tap outputs comprise a signal window, and second and third groups of said tap outputs on either side of said signal window taps comprise first and second noise windows, adaptive filter means responsive to said normalizer output for adapting respective tap weights applied to said tap outputs, means for respectively combining said signal window tap outputs, said first noise window tap outputs and said second noise window tap outputs to provide respective combined signal, first noise and second noise components, means for combining said first and second noise components to provide a composite noise component, and means for subtracting said composite noise component from said signal component to provide said normalizer output,
    wherein said normalizer adapts to locally non-stationary noise and time-spreading of said signal component.

* * * * *